Sept. 15, 1964  C. W. SIDWELL  3,148,868
REHEATING FURNACE
Filed March 24, 1960  2 Sheets-Sheet 2
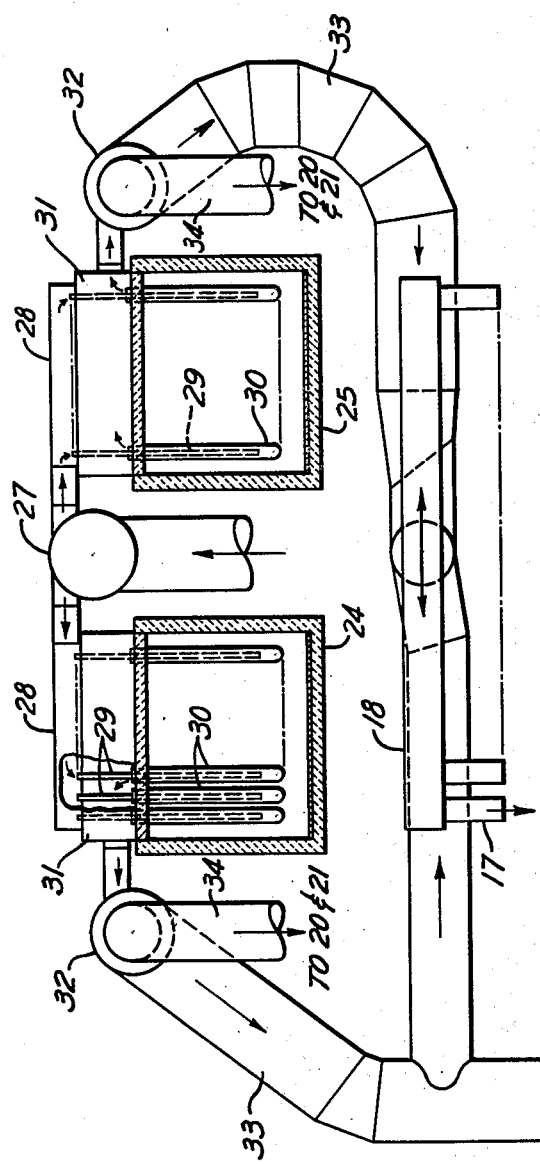
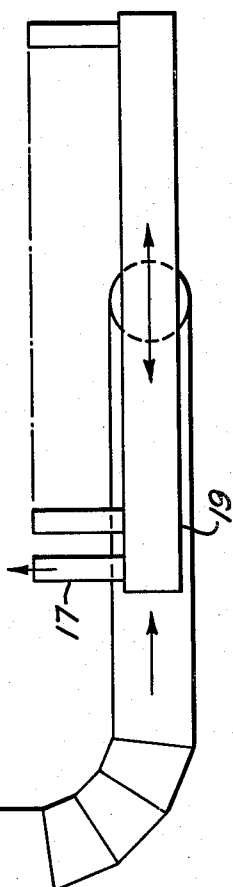
INVENTOR.
CLARENCE W. SIDWELL
BY Donald G. Dalton
ATTORNEY

United States Patent Office 3,148,868
Patented Sept. 15, 1964

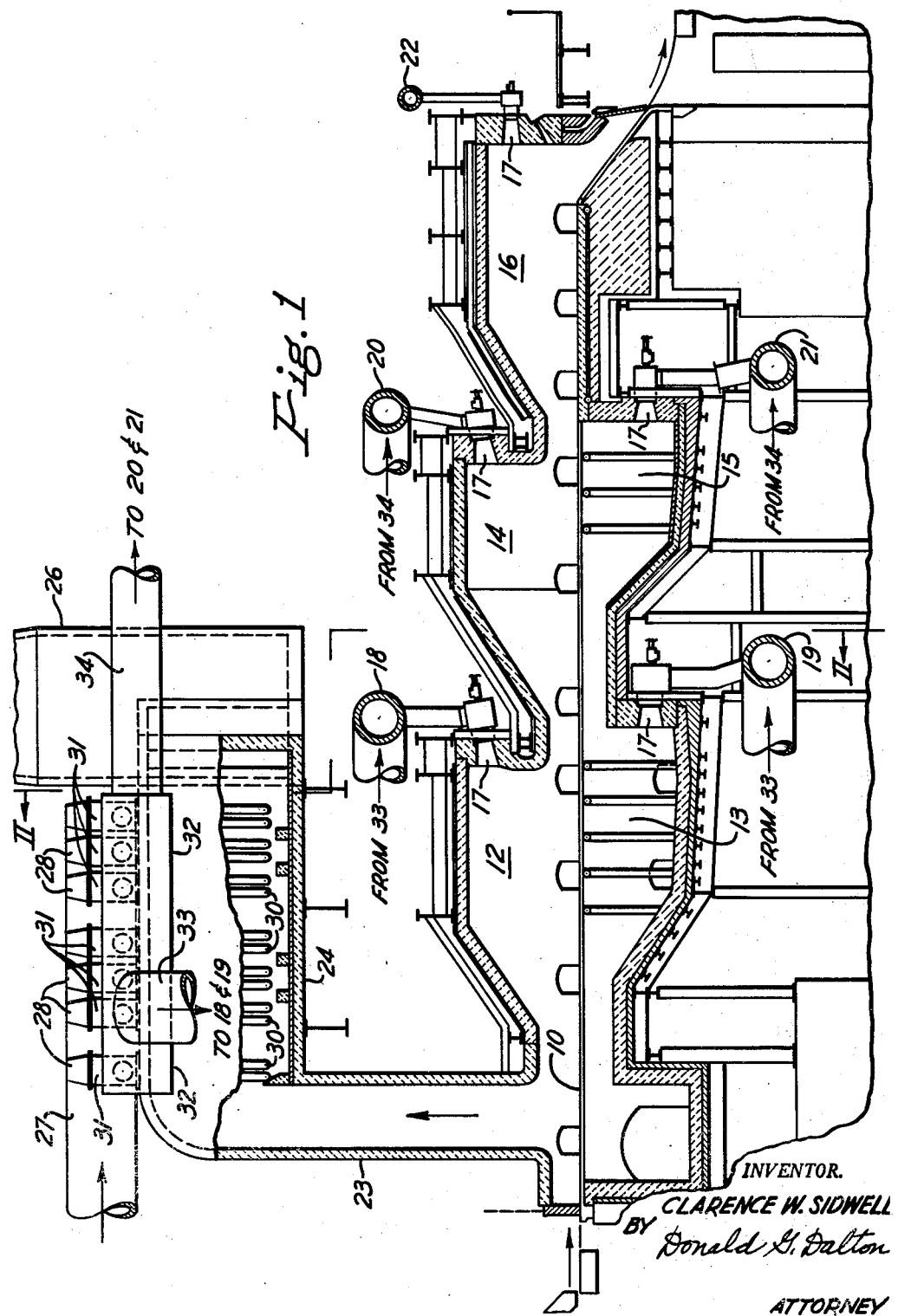

3,148,868
REHEATING FURNACE
Clarence W. Sidwell, Homewood, Ill., assignor to United States Steel Corporation, a corporation of New Jersey
Filed Mar. 24, 1960, Ser. No. 17,335
4 Claims. (Cl. 263—15)

This invention relates to an improved reheating furnace for semifinished metal shapes, such as steel slabs, blooms, billets or the like.

A conventional reheating furnace includes an enclosed elongated hearth over which work travels from the charging end to the discharge end. The space within the furnace enclosure is divided into several combustion zones situated both above and below the hearth. Such furnaces are equipped with recuperators which utilize sensible heat in the flue gas to preheat combustion air. The usual practice is to preheat air for all the zones to about the same temperature, even though the zones operate at increasing temperatures from the charging end toward the discharge end. Nevertheless it is known to preheat air for different zones to different temperatures by use of recuperators through which controlled portions of the flue gas flow in parallel. Such recuperators are equipped with dampers for apportioning the flue gas and air. These arrangements do not afford best utilization of sensible heat available in the flue gas nor of the recuperator investment.

An object of the present invention is to provide an improved reheating furnace in which combustion air for different zones is preheated to different temperatures, but which embodies a more efficient recuperator arrangement than previous furnaces of this type.

A more specific object is to provide an improved counterfired reheating furnace in which preheated combustion air for different zones is taken from spaced locations in the same recuperator; that is, hot air headers leading to zones nearest the charging end of the hearth are connected to hotter parts of the recuperator than headers leading to zones farther along the hearth.

In accomplishing these and other objects of the invention, I have provided improved details of structure, a preferred form of which is shown in the accompanying drawings, in which:

Figure 1 is a longitudinal sectional view (partly in side elevation) of a reheating furnace equipped with recuperators in accordance with my invention; and FIGURE 2 is a cross section on line II—II of FIGURE 1, omitting the furnace walls and hearth to show the piping more clearly.

FIGURE 1 shows a reheating furnace which, apart from the recuperator arrangement, can be of any conventional plural-zone construction. The charging end is at the left and the discharge end at the right. The furnace has the usual hearth 10 formed of laterally spaced water-cooled skids over which work is pushed for reheating. The top and bottom walls of the furnace define first and second combustion zones 12 and 13 above and below the hearth nearest the charging end, and third and fourth combustion zones 14 and 15 above and below the hearth intermediate the furnace length. The top wall and hearth define a "soak" zone 16 adjacent the discharge end. Each zone is equipped with burners 17 which are directed toward the charging end; that is, the furnace is counter-fired. Headers 18, 19, 20, 21 and 22 supply combustion air to the burners in zones 12, 13, 14, 15 and 16 respectively. Liquid or gaseous fuel can be supplied to the burners through any suitable conventional means not shown. An uptake 23 for flue gas extends from the top wall at the charging end to parallel recuperators 24 and 25 of similar construction hereinafter described. Ultimately the flue gas passes out a stack 26.

Each recuperator 24 and 25 includes a horizontally extending, refractory walled enclosure situated above the furnace enclosure. The uptake 23 is connected to the left ends of the two recuperator enclosures, and the stack 26 to the right ends. Thus the recuperators are progressively cooler from the left end to the right end as heat is extracted from the flue gas. A longitudinal cold air header 27 extends above the space between the two recuperators (FIGURE 2). A plurality of cold air boxes 28 (seven on each side in the illustration) are connected to header 27 and extend at right angles thereto spaced above the two recuperators. A plurality of inner open-ended tubes 29 depend from each cold air box into the recuperator enclosures. Outer vertical tubes 30, which are closed at their lower ends, depend from the top wall of each recuperator and receive the respective inner tubes 29. The outer tubes lead to hot air boxes 31 located immediately above the recuperator enclosures.

In accordance with my invention, longitudinal hot air headers 32 are connected to the hot air boxes 31 of each recuperator. Pipes 33 are connected to headers 32 near the ends where the flue gas is at its maximum temperature. These pipes extend to headers 18 and 19 to supply highly preheated combustion air to the burners 17 of the first and second zones 12 and 13. Pipes 34 are connected to headers 32 at the ends where the flue gas is at its minimum available preheat temperature. These pipes extend to headers 20 and 21 to supply combustion air preheated to a lower temperature to the burners 17 of the third and fourth zones 14 and 15. Combustion air for the "soak" zone 16 is not preheated.

From the foregoing description, it is seen that my invention takes preheated combustion air from the hotter parts of the recuperators for the first and second zones, and from cooler parts of the recuperators for the third and fourth zones. Typically air for the first and second zones may be at a temperature of about 900° F. when it leaves the recuperators and about 875° F. when it reaches the burners. Air for the third and fourth zones may be at a temperature of about 800° F. when it leaves the recuperators and about 775° F. when it reaches the burners. Air for the "soak" zone is at ambient temperatures and is of course coolest of all. I achieve this relation in a counterfired furnace from which flue gas discharges through an uptake at the charging end, and I use the same recuperators for obtaining two different temperatures of preheat. Thus I dispense with control dampers and I effectively utilize the full recuperator capacity under all conditions of firing.

While I have shown and described only a single embodiment of my invention, it is apparent that modifications may arise. Therefore, I do not wish to be limited to the disclosure set forth but only by the scope of the appended claims.

I claim:

1. In a reheating furnace which has a charging end and a discharge end, a hearth extending between said ends, walls defining at least two combustion zones in relation to said hearth, burners in each of said zones directed toward said charging end, means at said charging end for receiving flue gas, and at least one recuperator connected with said means for utilizing sensible heat in the flue gas for preheating air and adapted to become progressively cooler along its length as heat is extracted from the flue gas, the combination therewith of a header system for introducing air to said burners, said system comprising a hot air header connected to said recuperator to receive preheated air therefrom at decreasing temperatures from one end to the other, means connecting a higher temperature region of said header to the burners in at least one of said zones, and means connecting a lower temperature region of said header to the burners of at least another one of said zones.

2. In a reheating furnace which has a charging end and a discharge end, a hearth extending between said ends, walls defining first and second combustion zones above and below said hearth adjacent said charging end and third and fourth combustion zones above and below said hearth toward the discharge end from said first and second zones, burners in each of said zones directed toward said charging end, means at said charging end for receiving flue gas, and at least one recuperator connected with said means for utilizing sensible heat in the flue gas for preheating air and adapted to become progressively cooler along its length as heat is extracted from the flue gas, the combination therewith of a header system for introducing air to said burners, said system comprising a hot air header connected to said recuperator to receive preheated air therefrom at decreasing temperatures from one end toward the other, means connecting a higher temperature region of said header to the burners in said first and second zones, and means connecting a lower temperature region of said header to the burners in said third and fourth zones.

3. In a reheating furnace which has a charging end and a discharge end, a hearth extending between said ends, walls defining first and second combustion zones above and below said hearth adjacent said charging end, third and fourth combustion zones above and below said hearth toward the discharge end from said first and second zones, and a soaking zone above said hearth adjacent said discharge end, burners in each of said zones directed toward said charging end, means at said charging end for receiving flue gas, and at least one recuperator connected with said means for utilizing sensible heat in the flue gas for preheating air and adapted to become progressively cooler along its length as heat is extracted from the flue gas, the combination therewith of a header system for introducing air to said burners, said system comprising a hot air header connected to said recuperator to receive preheated air therefrom at decreasing temperatures from one end toward the other, means connecting a higher temperature region of said header to the burners in said first and second zones, means connecting a lower temperature region of said second header to the burners in said third and fourth zones, and means connected to the burners in said soaking zone for supplying air at ambient temperature thereto.

4. In a reheating furnace which has a charging end and a discharge end, a hearth extending between said ends, walls defining first and second combustion zones above and below said hearth adjacent said charging end and third and fourth combustion zones above and below said hearth toward the discharge end from said first and second zones, burners in each of said zones directed toward said charging end, an uptake at said charging end for receiving flue gas, and at least one recuperator connected with said uptake for utilizing sensible heat in the flue gas for preheating air and adapted to become progressively cooler along its length as heat is extracted from the flue gas, said recuperator including a plurality of hot air boxes for receiving air heated to varying temperatures, the combination therewith of a header system for introducing air to said burners, said system comprising a hot air header connected to the hot air boxes to receive air preheated to varying temperatures therefrom, piping connecting a higher temperature region of said header to the burners in said first and second zones, and piping connecting a lower temperature region of said header to the burners in said third and fourth zones.

References Cited in the file of this patent

UNITED STATES PATENTS

| 2,157,221 | Spencer et al. | May 9, 1939 |
| 2,171,353 | Brassert | Aug. 29, 1939 |
| 2,670,945 | Hazen | Mar. 2, 1954 |
| 2,841,383 | Hazen | July 1, 1958 |

FOREIGN PATENTS

| 563,764 | Canada | Sept. 23, 1958 |